(12) United States Patent
Travis et al.

(10) Patent No.: US 6,435,616 B1
(45) Date of Patent: Aug. 20, 2002

(54) LATCHING DEVICE FOR ARTICULATED ELEMENTS, IN PARTICULAR, ELEMENTS FORMING VEHICLE SEATS

(75) Inventors: William H. Travis, Kodak; Hiroshi Takayanagi, Murfreesboro, both of TN (US)

(73) Assignee: SW Manufacturing, Inc, Smithville, TN (US)

( * ) Notice: Subject to any disclaimer, the term of this patent is extended or adjusted under 35 U.S.C. 154(b) by 0 days.

(21) Appl. No.: 09/471,379

(22) Filed: Dec. 23, 1999

(51) Int. Cl.[7] ................................................. B60N 2/02
(52) U.S. Cl. ................................................. 297/378.12
(58) Field of Search ....................... 297/378.12, 216.13, 297/354.12

(56) References Cited

U.S. PATENT DOCUMENTS

| | | | |
|---|---|---|---|
| 3,628,831 A | * 12/1971 | Close | |
| 3,642,100 A | 2/1972 | Travis | |
| 4,343,508 A | 8/1982 | Heling et al. | |
| 4,444,431 A | 4/1984 | Suzuki | |
| 4,484,779 A | 11/1984 | Suzuki | |
| 4,699,418 A | 10/1987 | Plavetich | |
| 4,762,366 A | * 8/1988 | Bauer et al. | |
| 4,932,706 A | 6/1990 | Wainwright et al. | |
| 5,466,048 A | 11/1995 | Fowler et al. | |
| 5,810,444 A | * 9/1998 | Refior et al. | |
| 5,934,732 A | 8/1999 | Jakubiec | |

* cited by examiner

Primary Examiner—Milton Nelson, Jr.
(74) Attorney, Agent, or Firm—Greenblum & Bernstein, P.L.C.

(57) ABSTRACT

A latching device for a backrest of a vehicle seat is provided, including a mounting bracket having an arcuate slot extending therethrough and configured to be mounted to a support member on the vehicle, and a backrest mounting arm pivotally mounted to the mounting bracket by a first pivot. The backrest mounting arm also includes a pair of spaced detent notches to retain the backrest mounting arm in first and second positions. A release lever is pivotally mounted to the mounting bracket by a second pivot spaced from the first pivot, and includes a latch pin. The latch pin extends through the arcuate slot and is engagable with a detent notch to retain the backrest mounting arm in a position. The arcuate slot, the detent notch and the latch pin are configured so that a load tending to cause relative pivoting of the mounting bracket and the backrest mounting arm tends to urge the latch pin toward a release position to aid disengagement of the latch pin from the detent notch, and when the load reaches a threshold value, the latch pin deflects to engage one side wall of the arcuate slot, to prevent the latch pin from movement out of engagement with the detent notch so that the backrest mounting arm is maintained in the first position. Thus, a primary load path is defined between the mounting bracket, the backrest mounting arm and the latch pin that carries normal loads, and a secondary load path is defined between the mounting bracket, the backrest mounting arm and the latch pin that carries loads above a threshold load.

53 Claims, 12 Drawing Sheets

LATCHING DEVICE FOR ARTICULATED ELEMENTS, IN PARTICULAR, ELEMENTS FORMING VEHICLE SEATS

BACKGROUND OF THE INVENTION

1. Field of the Invention

The present invention relates to a latching device, particularly to a latching device for vehicle seats, and more particularly to a latching device for vehicle seats foldable and lockable in either of a seat forming or a cargo carrying position.

2. Background and Material Information

In an automobile, such as a two door coupe and the like, it is desirable to include a seat having a backrest which is capable of folding between an upright seating position and a forwardly folded position permitting ingress and egress to and from a rear seat of the automobile. For safety considerations, it is also desirable, as well as mandated by federal regulations, that the backrest be lockable in the upright position.

In other vehicles, such as a station wagons, pick up trucks, and sport utility vehicles, it is desirable to include a seat which is capable of folding between a locked upright seating position and a forwardly folded position. In the forwardly folded position, the back of the seat is often used as a load carrying surface such that, once the seat is folded forwardly, the back of the seat can be used as an extension of the vehicle floor to carry loads other than passengers, such as cargo.

In order to accomplish such a function, it is necessary to provide a latching device for the seat back which can lock the backrest in the upright position for carrying passengers, and it is also desirable to lock the backrest in the cargo carrying position in order to maintain a stable surface for the cargo placed thereon during transportation.

Furthermore, in recent years such latching mechanisms for seat backs have been required by federal regulation to pass a crash test, i.e., the Federal Motor Vehicle Safety Standards Test Requirements (FMVSS Test Requirements). These FMVSS Test Requirements relate to conditions that a seatback latch would be subjected to in a vehicle crash situation. The loads on the seatback latching mechanism are much greater during a crash situation than the low loads that are present during normal operation of the seatback latching mechanism. In this regard, the test dummies and the seatback mass experience deceleration loads of 20–30 g's during the tests. Accordingly, for seatback latching mechanisms of the type that the present invention is directed to, the dynamic load imparted to the latching mechanism from the seatback mounting arm may be 10,000 kg for a very short period of time. Thus, the latching mechanism must be designed to carry 100 times the normal load during the FMVSS testing without structural failure of the latching mechanism or disengagement of the latching mechanism during the crash test.

In a known device of this type, a backrest mounting arm is pivotally mounted to a mounting bracket to which a latching lever is pivotally mounted. The backrest mounting arm includes a pair of notches at a lower end thereof at positions defining the upright position of the backrest and the forwardly folded position, and the latching/release lever includes a latching portion to engage in a respective one of the notches to retain the backrest mounting arm in either one of the upright or forwardly folded positions. Furthermore, the latching/release lever includes pivoting feature for moving the latching portion out of the notch to permit pivotal movement of the backrest mounting arm. However, in such a device, during the crash tests, it has been observed that the entire load for resisting movement of the backrest mounting arm during the FMVSS test is carried by the pivot pin mounting the latching/release lever to the mounting bracket, which often causes shearing of the pivot pin. It has also been observed that the latching portion of the latching lever is sometimes deformed laterally out of engagement with the retaining notch in the lower end of the backrest mounting arm. Either of these situations will result in a failure of the device to pass the crash test. The present inventors has determined that the reason for these failures is that previous latch designs carried the total FMVSS loads through the same latch load path that carries the loads during normal operation. Accordingly, by the present invention, a latch design has been provided that will carry a significant portion of the very high FMVSS loads through a secondary load path, thus enabling the latch design to be significantly improved for normal operation.

Additionally, in pivoting seatbacks of this type, it is also important that, in use, the seatback does not "chuck" (i.e., vibrate back and forth as the automobile is driven) due to play in the latching mechanism. This "chucking" is difficult to prevent because the radius from the seat back pivot to the latching mechanism is small, on the order of about 25–50 mm, and the radius from the seatback pivot to the top of the seatback where the "chucking" is observed is very large, on the order of about 700–1000 mm. Thus, an extremely small clearance in the latching mechanism results in a very large movement in the seatback. Furthermore, wear of the latch components during the life of the automotive vehicle also results in an increase in the amount of "chucking".

In this regard, it has been observed that excessive "chucking" has been a problem with previous latch designs.

Moreover, another important design consideration is the load required for operation of the latch release lever. Thus, other requirements are that the load necessary for operation of the release lever be low and the length of travel during operation be short. These parameters must also be consistent from vehicle to vehicle for the 100,000 to 500,000 vehicles in which the seatback latches are installed during manufacture each year. It should be noted that during normal operation of the seatback, the only loads that must be overcome to release the latch are (1) any biasing load on the seatback due to gravity, (2) any load resulting from a seatback biasing spring, and (3) any biasing load on the release lever resulting from a return spring. Typically during normal operation, the low loads carried from the seatback mounting arm through the latch pin to the release lever pivot connected to the vehicle body (e.g., by a mounting bracket) are about 100–150 kg. It has been observed that release lever loads for previous latch designs have been too high and vary significantly from vehicle to vehicle.

Additionally, with previous latch designs, the design of the latch had to be compromised for the normal operating functions (release lever effort and chucking) in order to meet the FMVSS Test Requirements. In this regard, previous latch designs included an angled face on the detent portion of the latch. However, if the angled face on the detent portion is too great, the latch will be disengaged during FMVSS testing due to the radial component of the 10,000 kg load that is applied through the backrest mounting arm. Thus, since the latching device of the previous latch designs must be configured in order to ensure that none of the production latches would become disengaged under FMVSS loads during testing, the angled face of the detent portion had to be reduced as low as possible to prevent release during testing.

On the other hand, with previous latch designs, when the angled face on the detent portion is reduced too greatly, release handle operating loads increased significantly and large variations in operations from latch to latch in high volume production may occur due to tolerance variations in components and during assembly. Furthermore, the amount of tolerance variation that can be taken up and/or the amount of wear during durability testing that can be taken up is greatly reduced. Thus, the result of such reduction of the angle face is that to (1) release handle loads increase significantly and are more inconsistent, and to (2) minimize "chucking", the tolerances of the latch components must be reduced significantly, thereby significantly increasing costs and manufacturing difficulty.

Accordingly, the present invention has been provided to overcome the above-noted disadvantages during FMVSS testing, plus to enhance the design, to meet the above-noted design requirements for normal operation, to provide a latching device that will permit smooth and efficient operation of the backrest to either the upright position or the forwardly folding position, and also to enable the latching device to withstand loads to pass the FMVSS Test Requirements. The resulting design allows lower, more consistent operating effort, minimum "chucking of the backrest, weight reduction of the elements forming the latching device, and lower manufacturing and assembly costs.

SUMMARY OF THE INVENTION

According to one aspect of the present invention, the latching device of the present invention is configured with a detent portion having an angled face between the latch point and a face of a latching member provided on a release lever that is greater than that of previous latch designs, which results in minimal "chucking" of the seat back during normal operation. The angled face of the detent portion is required due to the normal tolerance variation in the components of the latching device. Without the angled engagement between the detent portion and the latching member, the components would have to be designed for operation with the worst-case tolerances. In this case when the tolerances of the components stack up in the other direction, the detent portion and latching member would have a very large clearance, which would result in excessive seatback "chucking".

The angled face between the latch point and the latching member also results in zero latch clearance being maintained even when wear occurs during the life of the latch. The greater the angled face on the detent portion of the latch, the more variation in latch component tolerances, or the more wear during durability testing, can be accommodated with the latch construction of the present invention. Furthermore, the greater the angled face on the detent portion of the latch, the lower the release handle loads will be that are necessary to release the latch during normal operating conditions.

Accordingly, the latching device of the present invention is configured with a detent portion having an angled face between the latch point and a face of a latching member provided on a release lever designed to optimize the normal latch operation, which provides a primary load path that permits easy operation of the release handle with lower, more consistent loads, results in minimal "chucking" of the seat back during normal operation, allows for increased tolerances in manufacture, and allows for more wear through the life of the latch while minimizing "chucking". Additionally, a load transfer abutment portion connected to the vehicle body is located adjacent to the detent portion and the latching member such that upon the application of a threshold load (such as a typical crash test load), the latching member is deflected into engagement with the load transfer abutment portion to provide a secondary load path for the much higher loads that must be carried during the crash condition.

Thus, during normal operation, the low loads, e.g., about 100–150 kg, are carried by the primary load path from the backrest mounting arm through the latching member to the release lever pivot attached to a mounting bracket secured to the vehicle body. The detent portion on the upper arm is angled to take up the tolerances in the components and also to reduce release efforts. With the present invention, this angle can be much greater because approximately 50% of the much higher loads that must be carried during the FMVSS testing are carried by the secondary load path through engagement of the latching member with the load transfer abutment portion secured to the vehicle body. However, the present invention can be configured to carry as much as 90–99% of the crash test load through the load transfer abutment portion secured to the vehicle body.

It should be noted that during FMVSS testing, the latching member of the latch device immediately deflects and engages the load transfer abutment portion secured to the vehicle body. The load transfer abutment portion has a zero degree angle relative to the direction of the load from the backrest mounting arm resulting from the crash test, and thus there is no radial component of the load. Therefore, friction between the latching member and the secondary load path transfer abutment portion prevents the latch from disengaging due to the force component resulting from the angled face of the detent portion for the normal load path.

Accordingly, as a result of the secondary load path that carries a high percentage of the high loads during the FMVSS testing, the latch components of the present invention can be configured with a greater angled face on the detent portion for normal operation without extremely close tolerances yet still prevent "chucking". Furthermore, the latch can be manufactured in high volume production yet have lower and much more consistent operator release handle forces without the concern that the latch will disengage when subjected to the very high FMVSS testing loads.

In another aspect of the present invention, the latching device includes a first bracket configured to be mounted to a support member, the first bracket including a load transfer abutment portion. A second bracket is pivotally mounted to the first bracket by a first pivot, the second bracket including at least one detent portion to retain the second bracket in a first position. A latching member is mounted on the first bracket and movable with respect thereto, the latching member extending adjacent the load transfer abutment portion and engagable with the at least one detent portion to retain the second bracket in the first position. Furthermore, a primary load path is defined between the first bracket, the second bracket and the latching member that carries normal loads associated with the second bracket, and a secondary load path is defined between the first bracket, the second bracket and the latching member that carries loads above a threshold load associated with the second bracket. Thus, components forming the latching device may be configured to have greater tolerances without increasing chucking of a seatback that may be connected to one of the first and second brackets and to provide reduced, more consistent release effort for disengagement of the latching member from the at least one detent portion while preventing inadvertent disengagement thereof during conditions above the threshold load.

In a further aspect of the present invention, the primary load path of the latching device is defined by the first bracket, the latching member, the detent portion, and the second bracket, and the secondary load path is defined by the first bracket, the load transfer abutment portion, the latching member, the detent portion, and the second bracket. Moreover, the load transfer abutment portion, the detent portion and the latching member are configured such that a load tending to cause relative pivoting of the first and second brackets urges the latching member toward a release position to aid disengagement of the latching member from the detent portion, and when the load reaches the threshold load, the latching member deflects to engage the load transfer abutment portion, such that when the threshold load is exceeded, a portion of the load is carried along the secondary load path, thereby preventing the latching member from movement out of engagement with the detent notch due to frictional engagement between the latching member and the load transfer abutment portion so that the second bracket is maintained in the first position.

In another aspect of the latching device of the present invention, the load transfer abutment portion on the first bracket is formed with a clearance relative to the latching member during normal operation to permit easy disengagement of the latching member from the detent portion upon actuation of the latching member to a release position, the clearance further being such that the latching member engages the load transfer abutment portion when deflected by the threshold load, which prevents the latching member from movement out of engagement with the detent portion so that the second bracket is maintained in the first position.

According to a further aspect of the present invention, the load transfer abutment portion in the first bracket is formed as an arcuate slot with two generally arcuate side walls concentric with a second pivot about which the latching member is movable, and the arcuate slot is sized to receive the latching member with the clearance during normal operation to permit easy disengagement of the latching member from the detent portion upon actuation of the latching member toward the release position, the clearance further being such that the latching member engages the load transfer abutment portion when deflected by the threshold load to defined the secondary load path. The clearance may be in the range of about 0.25 mm to about 1.25 mm, and preferably is about 0.5 mm.

In another aspect of the present invention, the at least one detent portion is formed as a detent notch in the second bracket. Furthermore, at least one side wall of the detent notch is configured to angle inwardly toward a bottom end of the detent notch, thereby absorbing greater tolerances of components of the latching device and providing a more consistent release effort for disengagement of the latching member from the detent portion, and the at least one side wall of the detent notch may have an arcuate configuration.

In a further aspect of the present invention, the latching member engages the arcuate side wall of the detent notch at a contact point such that a line L1 perpendicular to a tangent to the surface of the latching member at the contact point extends at an angle α with respect to a line C passing through a center of a second pivot of a release lever and a center of the latching member the angle α lying within the range of about 2° to about 5°, and preferably about 3.5°. Furthermore, the arcuate side wall may be defined by a radius $R_1$ representing the distance from the center of the second pivot of the release lever to the contact point between the side wall and the latch pin, and the center of the radius $R_1$ is offset from the center of the second pivot such that the angle α is maintained in a range of about 2° to about 5°, and preferably at about 3.5°.

According to another aspect of the present invention, both side walls of the detent notch angle inwardly toward the bottom of the detent notch, thereby absorbing greater tolerances of components of the latching device and providing a more consistent release effort for disengagement of the latching member from the detent portion. Moreover, both side walls of the detent notch may have an arcuate configuration.

In another aspect of the present invention, the latching member of the latching device is formed as a latch pin, and the latch pin may engage a side wall of the detent notch at a contact point such that a line L1 perpendicular to a tangent to the surface of the latch pin at the contact point extends at an angle α with respect to a line C passing through a center of a second pivot of a release lever and a center of the latch pin, the angle α lying within the range of about 2° to about 5°, and preferably about 3.5°.

Additionally, the latching device may be provided for a backrest of a vehicle seat. Moreover, one of the first and second brackets may be mounted to the backrest, and the other of the first and second brackets may be mounted to the vehicle body.

In other aspects of the present invention, the latching member may be configured as a hook-shaped member fixed to the release lever or as a laterally extending portion of the release lever. Additionally, the load transfer abutment portion on the first bracket may be formed as a plurality of pins fixedly secured to the first bracket or as a notch portion provided to the first bracket.

In another aspect of the present invention, a third bracket configured generally as an allochiral pair to the first bracket may be provided, with the third bracket mounted such that the second bracket is positioned between the first and second brackets, and the secondary path carries 90% of the loads greater than the threshold value.

In a further aspect of the latching device of the present invention, a first bracket is configured to be mounted to a support member, the first bracket including a load transfer abutment portion. A second bracket is mounted for movement relative to the first bracket, the second bracket including at least one detent portion to retain the second bracket in a first position. Additionally, a latching member is mounted on the first bracket and movable with respect thereto, the latching member extending adjacent the load transfer abutment portion and engagable with the at least one detent portion to retain the second bracket in the first position. Accordingly, a primary load path is defined between the first bracket, the second bracket and the latching member that carries normal loads associated with the second bracket, and a secondary load path is defined between the first bracket, the second bracket and the latching member that carries loads above a threshold load associated with the second bracket. Thus, components forming the latching device may be configured to have greater tolerances without increasing chucking of a device that may be connected to one of the first and second brackets and to provide reduced, more consistent release effort for disengagement of the latching member from the at least one detent portion while preventing inadvertent disengagement thereof during conditions above the threshold load. Furthermore, the primary load path is defined by the first bracket, the latching member, the detent portion, and the second bracket, and the secondary load path is defined by the first bracket, the load transfer abutment portion, the latching member, the detent portion, and the second bracket.

According to a further aspect of the present invention, the load transfer abutment portion, the detent portion and the latching member are configured such that a load tending to cause relative movement of the first and second brackets urges the latching member toward a release position to aid disengagement of the latching member from the detent portion, and when the load reaches the threshold load, the latching member deflects to engage the load transfer abutment portion, such that when the threshold load is exceeded, a portion of the load is carried along the secondary load path, thereby preventing the latching member from movement out of engagement with the detent portion due to frictional engagement between the latching member and the load transfer abutment portion so that the second bracket is maintained in the first position.

In a further aspect of the present invention, the load transfer abutment portion on the first bracket is formed with a clearance relative to the latching member during normal operation to permit easy disengagement of the latching member from the detent portion upon actuation of the latching member to a release position, the clearance further being such that the latching member engages the load transfer abutment portion when deflected by the threshold load, which prevents the latching member from movement out of engagement with the detent portion so that the second bracket is maintained in the first position.

According to another aspect of the present invention, the load transfer abutment portion in the first bracket is formed as a slot with two side walls generally perpendicular to the direction in which the latching member is movable, and the slot is sized to receive the latching member with the clearance during normal operation to permit easy disengagement of the latching member from the detent portion upon actuation of the latching member toward the release position, the clearance further being such that the latching member engages the load transfer abutment portion when deflected by the threshold load to defined the secondary load path. The clearance may be about 0.25 mm to about 1.25 mm, and preferably about 0.5 mm.

In a further aspect of the present invention, the at least one detent portion is formed as a detent slot in the second bracket. Additionally, at least one side wall of the detent slot may angle inwardly toward a bottom end of the detent slot, thereby absorbing greater tolerances of components of the latching device and providing a more consistent release effort for disengagement of the latching member from the detent portion. Also, the latching member may engage the side wall of the detent slot at a contact point such that a line L1 perpendicular to a tangent to the surface of the latching member at the contact point extends at an angle α with respect to a line C passing through a center of a second pivot of a release lever and a center of the latching member the angle α lying within the range of about 2° to about 5°, and preferably about 3.5°.

In other aspects of the present invention, a third bracket configured generally as an allochiral pair to the first bracket may be provided, with the third bracket mounted such that the second bracket is positioned between the first and second brackets, and the secondary path carries 90% of the loads greater than the threshhold value. Furthermore, the latching member may be mounted for sliding movement.

According to another aspect of the present invention, a latching device for a backrest of a vehicle seat is provided, the latching device including a mounting bracket configured to be mounted to a support member, the mounting bracket including a load transfer abutment portion. A backrest mounting arm is pivotally mounted to the mounting bracket by a first pivot; the backrest mounting arm including at least one detent notch to retain the backrest mounting arm in a first position. A release lever is pivotally mounted to the mounting bracket by a second pivot spaced from the first pivot, the release lever including a latching member fixed at a position spaced from the second pivot, with the latching member extending adjacent the load transfer abutment portion and engagable with the at least one detent notch to retain the backrest mounting arm in the first position. Thus, a primary load path is defined between the mounting bracket, the backrest mounting arm and the latching member that carries normal loads associated with the backrest mounting arm, and a secondary load path is defined between the mounting bracket, the backrest mounting arm and the latching member that carries loads above a threshold load associated with the backrest mounting arm. Thus, components forming the latching device may be configured to have greater tolerances without increasing chucking of a seatback that may be connected to the backrest mounting arm and to provide reduced release effort for disengagement of the latching member from the at least one detent portion while preventing inadvertent disengagement thereof during conditions above the threshold load.

In another aspect of the latching device for a backrest of a vehicle seat according to the present invention, the load transfer abutment portion, the detent notch and the latching member are configured such that a load tending to cause relative pivoting of the mounting bracket and backrest mounting arms urges the latching member toward a release position to aid disengagement of the latching member from the detent notch, and when the load reaches a threshold value, the latching member deflects to engage the load transfer abutment portion, thereby preventing the latching member from movement out of engagement with the detent notch due to frictional engagement between the latching member and the load transfer abutment portion so that the backrest mounting arm is maintained in the first position.

In a further aspect of the latching device for a backrest of a vehicle seat according to the present invention, the load transfer abutment portion on the mounting bracket is formed with a clearance relative to the latching member during normal operation to permit easy disengagement of the latching member from the detent notch upon actuation of the release lever, the clearance further being such that the latching member engages the load transfer abutment portion when deflected by the threshold load, which prevents the latching member from movement out of engagement with the detent notch so that the backrest mounting arm is maintained in the first position.

In another aspect of the latching device for a backrest of a vehicle seat according to the present invention, the load transfer abutment portion in the mounting bracket may be formed as an arcuate slot with two generally arcuate side walls concentric with the second pivot and sized to receive the latching member with the clearance during normal operation to permit easy disengagement of the latching member from the detent notch upon actuation of the release lever, the clearance further being such that the latching member engages the load transfer abutment portion when deflected by the threshold load. Additionally, the clearance may be about 0.25 mm to about 1.25 mm, and is preferably about 0.5 mm.

In another aspect of the latching device for a backrest of a vehicle seat according to the present invention, at least one side wall of the detent notch may angle inwardly toward a bottom end of the detent notch, thereby absorbing greater tolerances of components of the latching device and providing a more consistent release effort for disengagement of the latching member from the detent portion.

According to a further aspect of the latching device for a backrest of a vehicle seat of the present invention, the at least one side wall of the detent notch has an arcuate configuration. Moreover, the latching member may engage the arcuate side wall of the detent notch at a contact point such that a line L1 perpendicular to a tangent to the surface of the latch pin at the contact point extends at an angle α with respect to a line C passing through a center of the second pivot of the release lever and a center of the latching member, the angle α lying within the range of about 2° to about 5°, and preferably about 3.5°.

Furthermore, both side walls of the detent notch may angle inwardly toward the bottom of the detent notch, thereby absorbing greater tolerances of components of the latching device and providing a more consistent release effort for disengagement of the latching member from the detent portion. Additionally, both side walls of the detent notch may have an arcuate configuration.

In an additional aspect of the the latching device according to the present invention, a third bracket configured generally as an allochiral pair to the first bracket may be provided, and the third bracket is mounted such that the second bracket is positioned between the first and second brackets, and the secondary path carries 90% of the loads greater than the threshhold value.

BRIEF DESCRIPTION OF THE DRAWINGS

Other advantages of the present invention will become apparent with reference to the following detailed description when considered in connection with the accompanying drawings wherein.

DETAILED DESCRIPTION OF THE PREFERRED EMBODIMENTS

Figure 1:
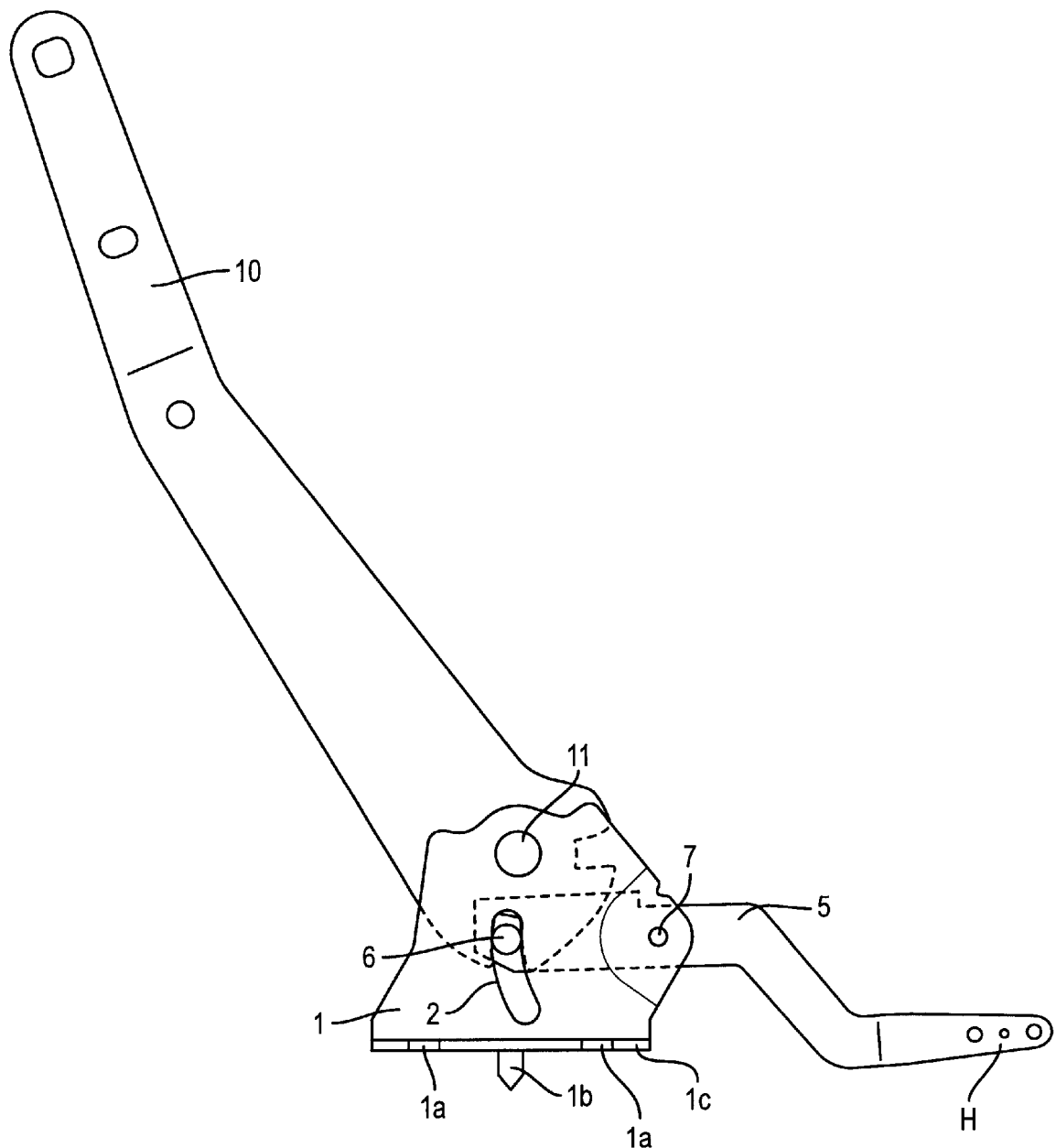
FIG. 1 is a side elevational view of the backrest mounting device according to the present invention locked in an upright position.
Figure 2:
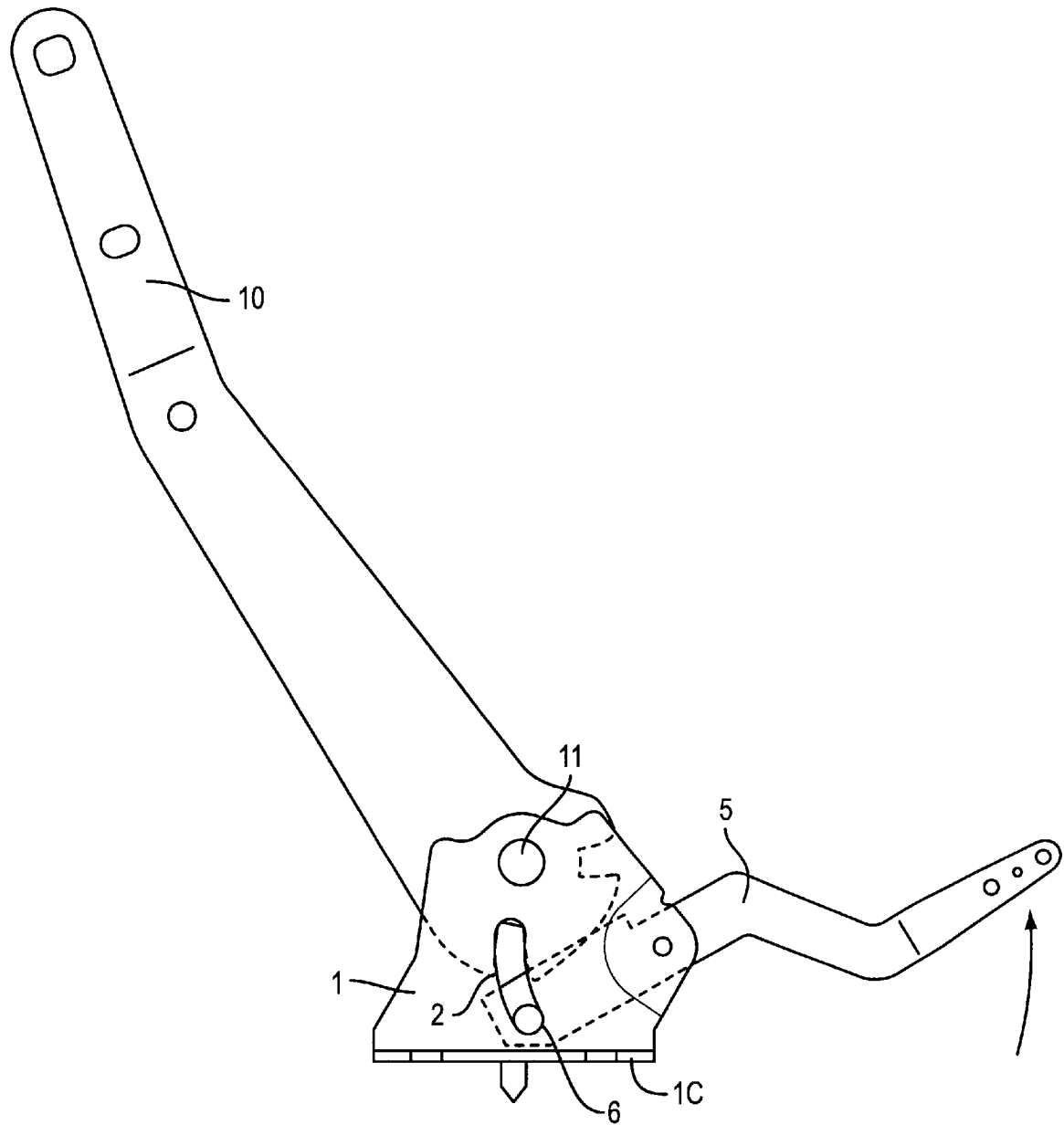
FIG. 2 is a side elevational view similar to FIG. 1 and showing the release lever pivoted to a release position.
Figure 3:
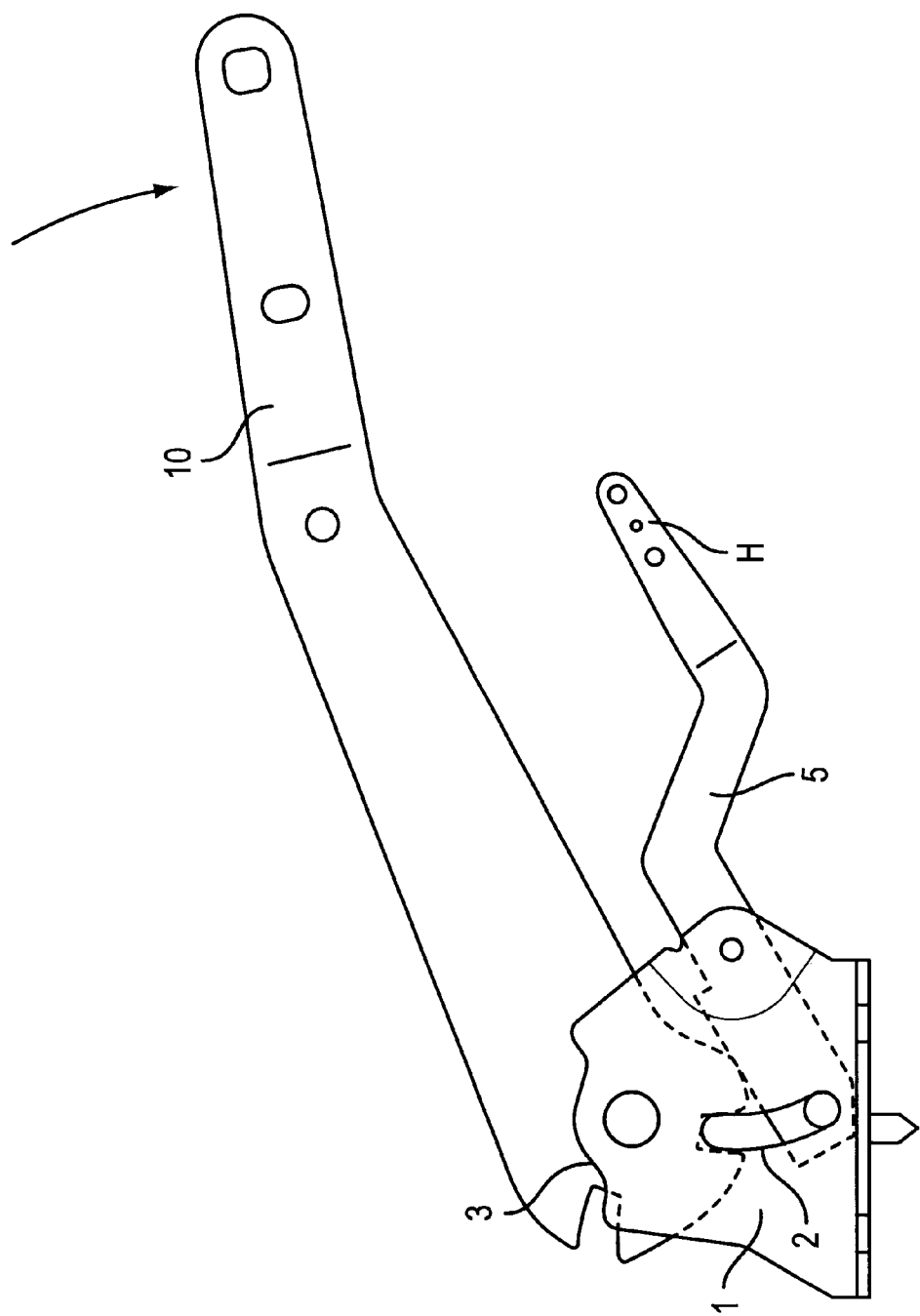
FIG. 3 is a side elevational view of the device in a forwardly folded position with the release lever in the release position.

Turning to FIGS. 1 and 2, one embodiment of the latching device for articulated elements of the present invention will now be described. A first bracket or mounting bracket 1 is provided to mount at least one seat member of a vehicle seat to the body of a vehicle (not shown). The mounting bracket 1 may include apertures 1a for securing the mounting bracket to the vehicle body in a conventional manner. The mounting bracket 1 may also include a locating pin 1b for positioning within a corresponding locating hole (not shown) in the vehicle body. The mounting bracket further includes a slot 2, which in the present embodiment, is configured as an arcuate slot that is concentric with a first pivot 7 for mounting a release lever 5 of the latching device. The slot 2 defines a load transfer abutment portion, the function of which will be set forth below. The upper surface of the mounting bracket 1 includes a first stop portion 3 and a second stop portion 4.

Figure 4:
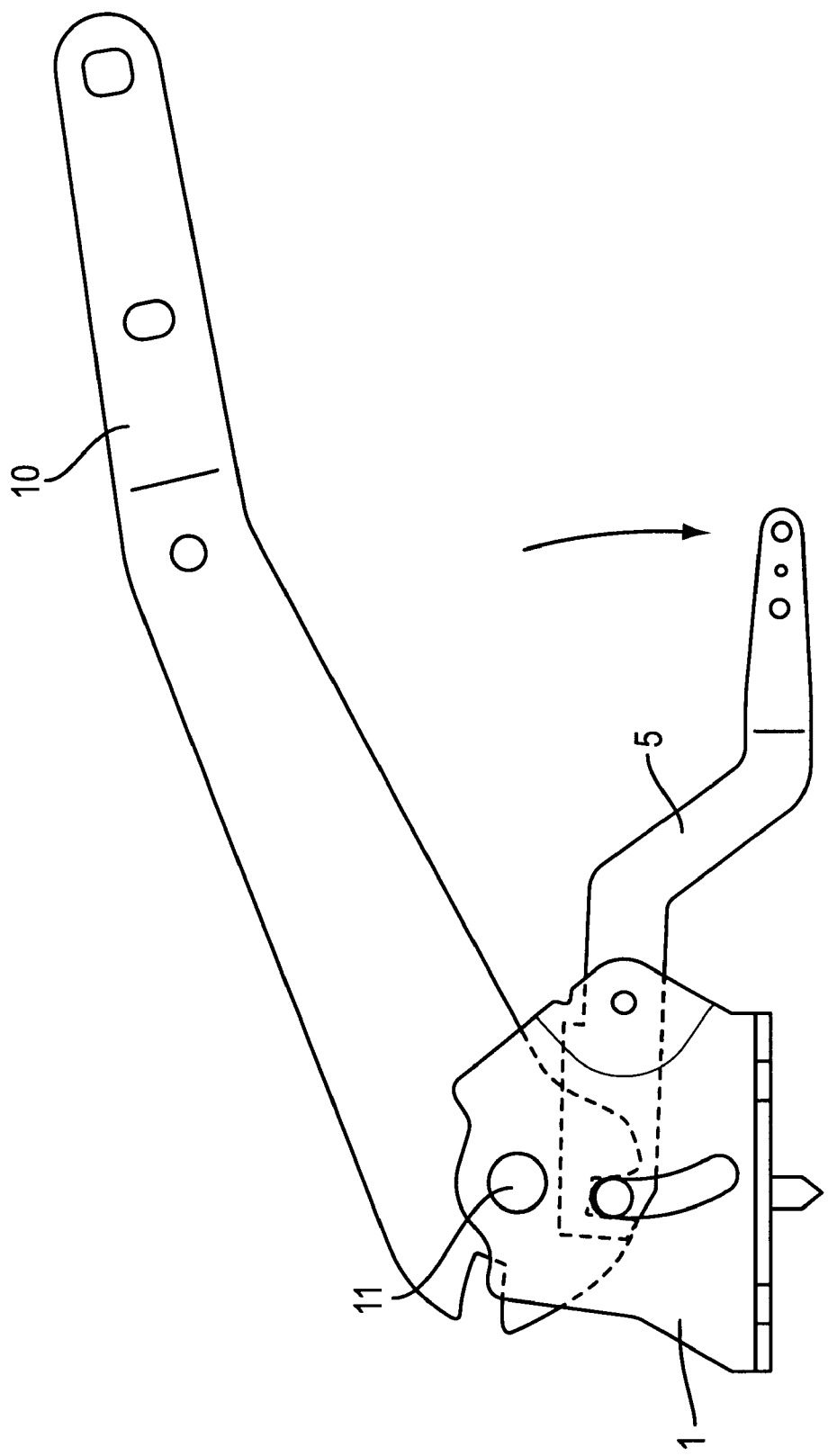
FIG. 4 is a side elevational view of the device of the present invention depicting the backrest mounting arm in the forward folded and locked position.

A second bracket or backrest mounting arm 10 is pivotally connected to the mounting bracket 1 by a second pivot 11 for pivotally mounting the backrest mounting arm to be movable relative to the mounting bracket. The backrest mounting arm includes a first detent portion or detent notch 13 at the lower end thereof, and a second detent portion or detent notch 14 at a position radially spaced relative to the first detent notch 13. The first detent notch 13 is engageable by a latching member or latch pin 6 provided on the release lever 5 to retain the backrest mounting arm 10 locked in a first position (FIG. 1) relative to the mounting bracket 1, and the latch pin 6 is engagable with the second detent notch 14 to releasably lock the backrest mounting arm 10 in a second position (FIG. 4) relative to the mounting bracket 1. The first position is typically an upright position for the backrest mounting arm, and the second position is typically a forwardly folded position of the backrest mounting arm.

Additionally, a spring (not shown) may be provided about the second pivot 1 for engagement with the backrest mounting arm 10 in a conventional manner to provide a biasing force to bias the backrest mounting arm 10 in either the first or second pivotal directions, and such a spring conventionally biases the backrest mounting arm 10 toward a forwardly folded position. Of course, the biasing spring can be a coil spring, a torsion spring, or any suitable spring that will bias the backrest mounting arm and the mounting bracket relative to one another.

Figure 5:
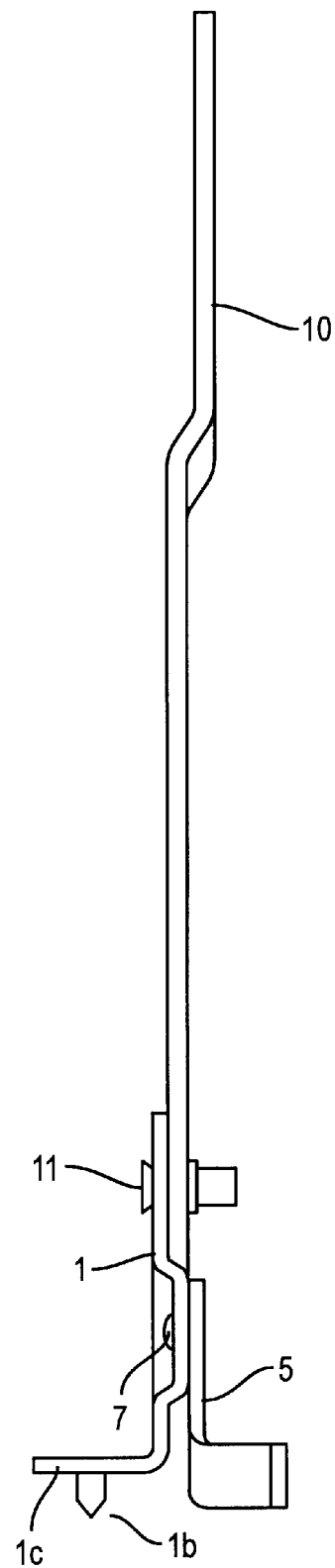
FIG. 5 is a rear elevational view of the latching device of the present invention.
Figure 6:
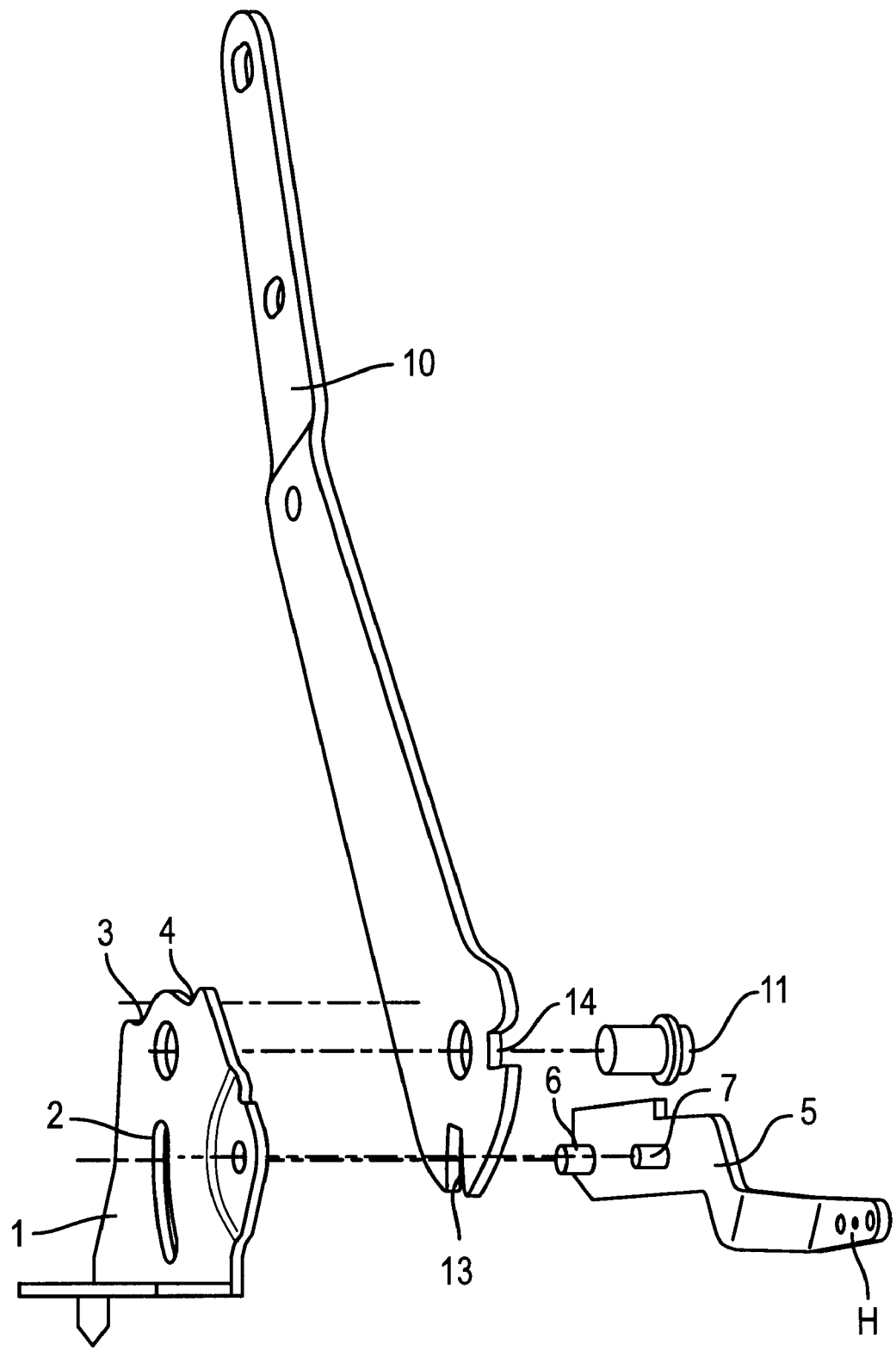
FIG. 6 is an exploded perspective view of the latching device of the present invention.
Figure 7:
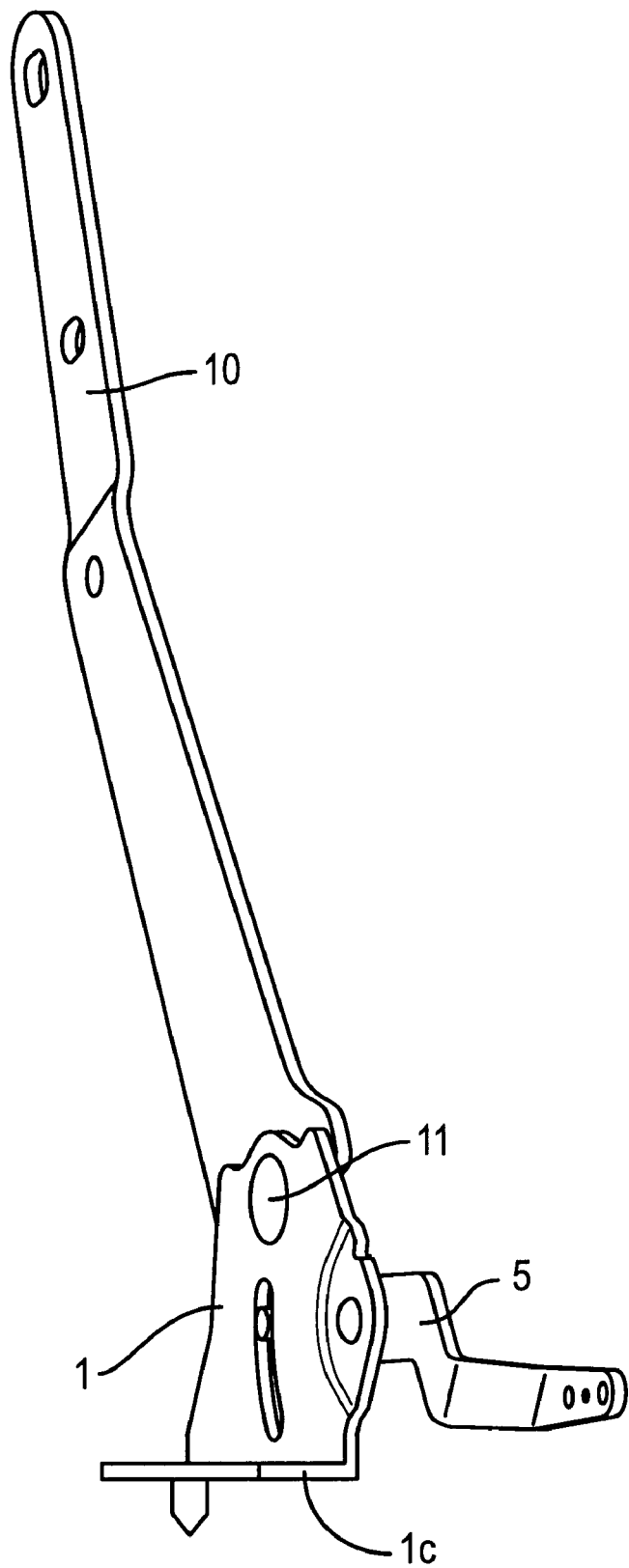
FIG. 7 is a perspective view of the latching device of the present invention.

The release lever 5 is pivotally mounted by a first pivot 7 to the mounting bracket 1 on same side of the mounting bracket 1 on which the backrest mounting arm 10 is mounted, as seen in FIG. 5. The release lever 5 includes an elongated handle portion H at one end thereof, and at the opposite end is located the latch pin 6 fixed at a position spaced from the first pivot 7. The latch pin 6 may be attached to the release lever 5 in any suitable manner, such as by swaging, welding, brazing, etc. The release lever is biased toward engagement with the first and second detent notches 13, 14 by any conventional spring member (not shown), such as a coil spring, a torsion spring, or any suitable spring that will bias the release lever toward a position such that the latch pin 6 is retained in a respective detent notch.

The mounting bracket 1, the backrest mounting arm 10, the release lever 5, and the latch pin 6 may be formed of any suitable metal or metal alloy that will satisfy the functional design requirements, such as steel or aluminum, although aluminum would not normally be suitable for the pin 6.

Accordingly, as can be seen from FIGS. 1 and 2, the latch pin 6 of the release lever 5 is normally positioned within the first detent notch 13 to releasably lock the backrest mounting arm in the upright position, and the release lever 5 may be pivoted in a counterclockwise direction about the second pivot 7 (FIG. 2) to release the latch pin 6 from the first detent notch 13 to allow the backrest mounting arm 10 to pivot forwardly to a second position (FIG. 4) where the latch pin 6 is releasably positioned within the second detent notch 14 to retain the backrest mounting arm 10 in a second, forwardly folded, position. When the latching member, in this embodiment the latch pin 6, is positioned within the first detent portion or notch 13, in this case the backrest mounting arm, the first detent portion, the latching member, and the mounting bracket define a primary load path that carries normal loads associated with the backrest mounting arm.

Furthermore, the detent notches 13, 14 in the backrest mounting arm 10 and the latch pin 6 are configured such that a force tending to cause relative pivoting of the mounting bracket 1 and backrest mounting arm 10 tends to urge the latch pin 6 toward a release position to aid disengagement of the latch pin from the detent notch 13 during operation of the latch under normal conditions, which make operation of the release lever to disengage the latch easier. However, should the force tending to cause relative pivoting of the backrest mounting arm 10 and mounting bracket 1 reach a threshold value exceeding the maximum normal operating loads, i.e., about twice the normal operating load, or about 200–300 kg, due to circumstances that would exist in a crash of the automotive vehicle in which the device is mounted (or during a crash test), the latching member or latch pin 6 is caused to deflect laterally into engagement with an edge of the load transfer abutment portion, e.g., slot 2 in the mounting bracket 1, thereby preventing the latch pin 6 from movement out of engagement with the first detent portion or detent notch 13 so that the backrest mounting arm is maintained in the first, upright position. When the latching member, in this case latch pin 6, is deflected into engagement with the load transfer abutment portion, in this case slot 2, the backrest mounting arm, the detent portion, the latching member, the load transfer abutment portion, and the mounting bracket define a secondary load path that carries a portion of the loads above a threshold load above the maximum normal operating loads (about twice the normal operating load, or about 200–300 kg) associated with the backrest mounting arm, such as those encountered during a vehicle crash or a crash test.

The particular relationship of the elements of the present invention that provides the above operation that prevents the latch pin 6 from moving out of engagement with the detent recess 13 during a crash, yet aids the release thereof during normal conditions will now be described with particular reference to FIGS. 8–10.

Figure 8:
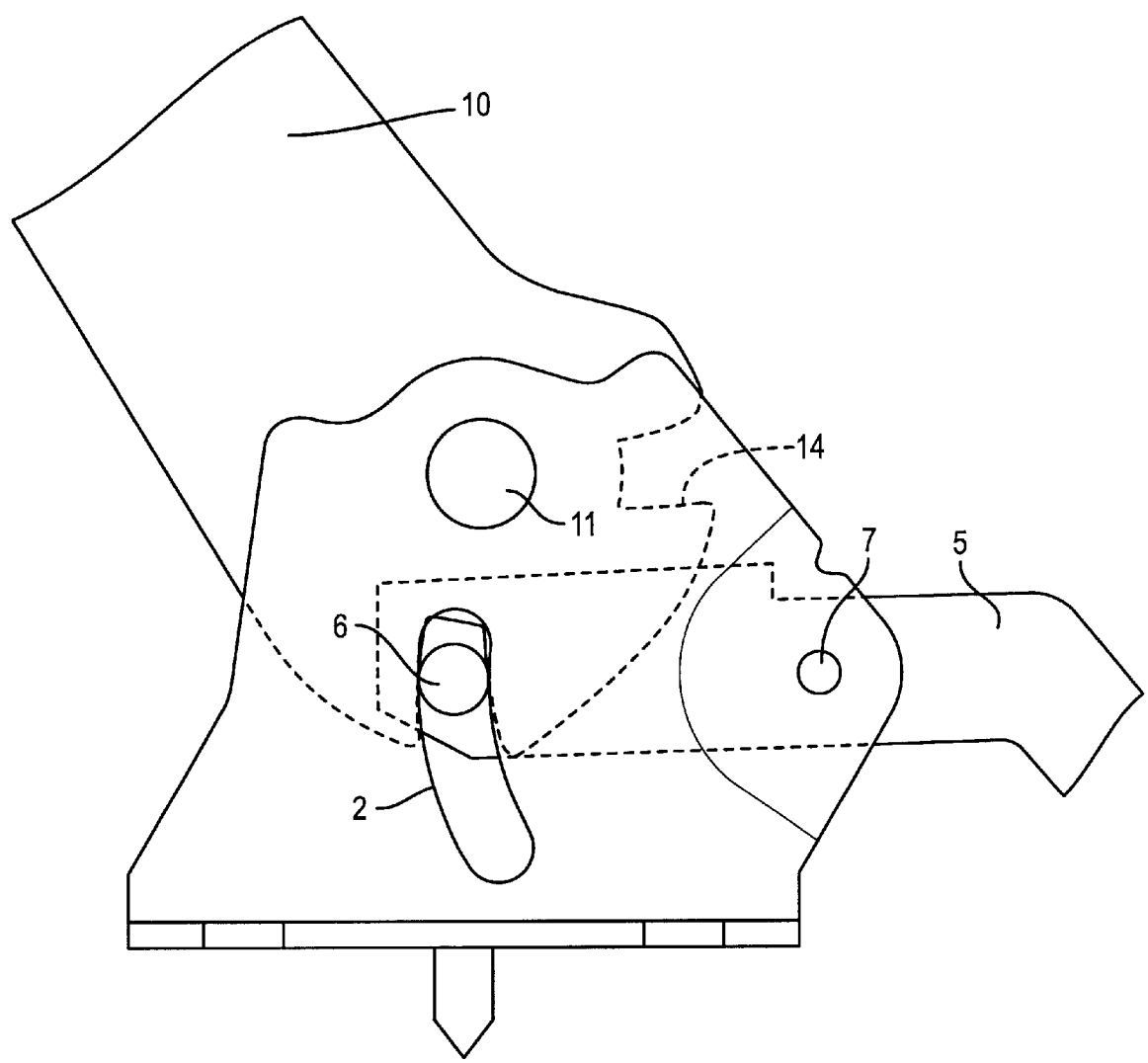
FIG. 8 is an enlarged side elevational view of the present invention in the area of the mounting bracket.
Figure 9:
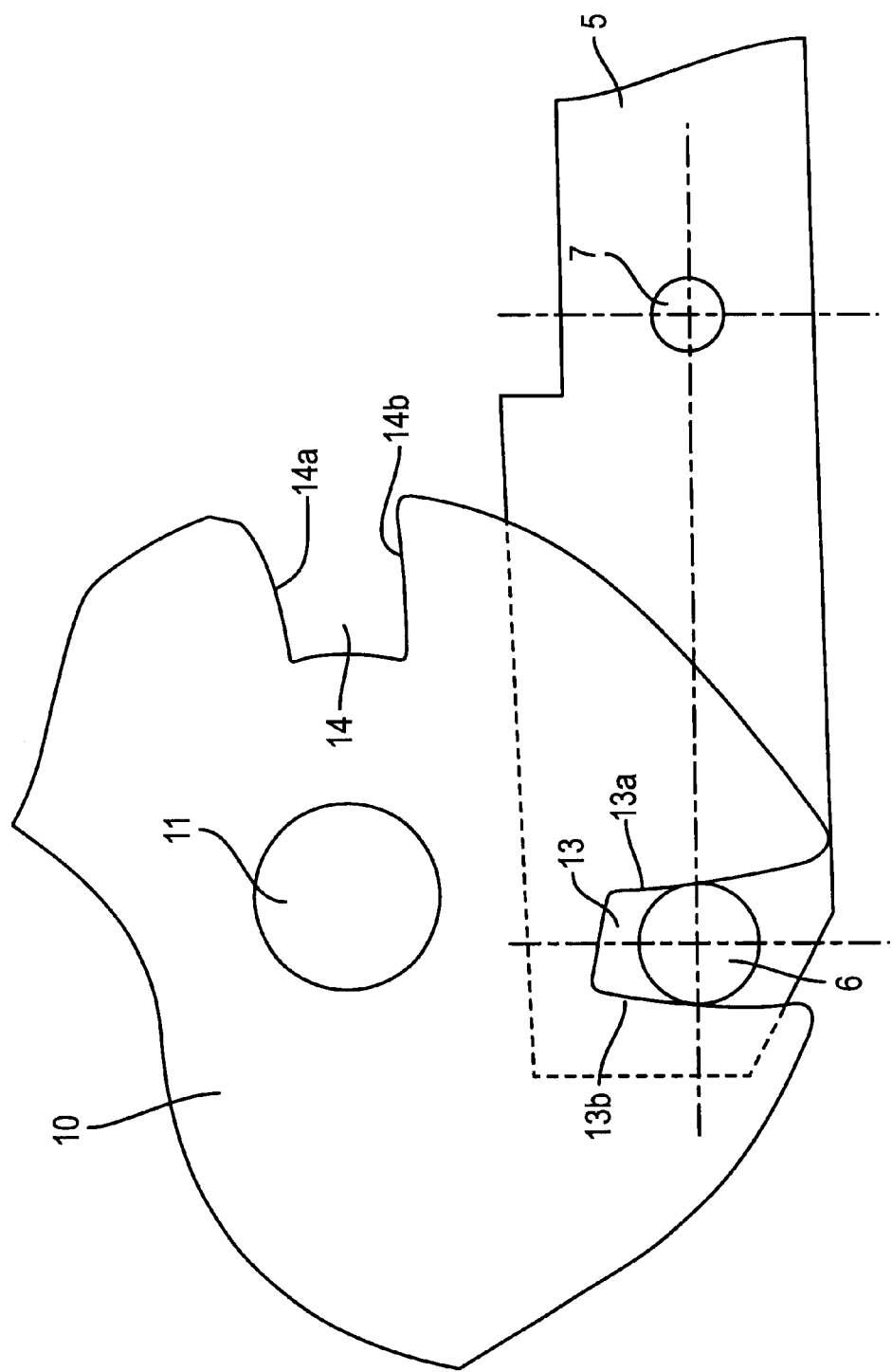
FIG. 9 is an enlarged detailed view, with portions removed to show the relationship of the release lever, latching pin and detent notch of the backrest mounting arm.

Referring to FIG. 8, the slot 2 is formed in the mounting bracket 1 to be arcuate, with the opposite side walls of the slot 2 being arcuate and concentric with the second pivot 7 mounting the release lever 5 to the mounting bracket 1. Furthermore, the arcuate slot 2 is sized to receive the latch pin 6 with a clearance therebetween of about 0.25 mm to about 1.25 mm between the outer surface of the latch pin 6 and each side wall of the arcuate slot 2. The clearance is such that the latch pin 6 operates freely without engagement with the side walls of the slot during normal conditions, but is sufficiently close to be engaged by the latch pin 6 when the latch pin 6 is deflected due to application of the threshold load on the backrest mounting arm. According to a preferred embodiment of the present invention, the clearance is set to be about 0.5 mm between each side wall of the slot 2 and the latch pin 6.

Also important to the above operation of the elements of the present invention is the configuration of the detent portion or detent notch 13, which will now be described with reference to FIGS. 9–11. As shown in FIGS. 9 and 11, the detent notch 13 includes a front arcuate side wall 13a having a first radius of curvature $R_1$ and a rear arcuate side wall 13b having a second radius of curvature $R_2$. The radius $R_1$ is the distance from the center of the pivot 7 of the release lever to the point of contact between the side wall 13a and latch pin 6, and the center of the radius $R_1$ is offset to the left of and above the center of the pivot 7 as shown in FIG. 11, for reasons described below. Additionally, The radius $R_2$ is the distance from the center of the pivot 7 of the release lever to the point of contact between the side wall 13b and latch pin 6, and the center of the radius $R_2$ is offset to the left of and below the center of the pivot 7 as shown in FIG. 11, for reasons described below. Also, as shown in FIG. 9, the side walls 13a and 13b angle inwardly toward the bottom of the detent notch 13 to provide a generally wedging engagement with the latch pin 6.

Thus, the angled side walls 13a and 13b each present an angled face with respect to the latch point (the point of contact between a respective side wall 13a, 13b). As can be seen in FIG. 10, each face (side wall 13a, 13b) of the detent notch is angled with respect to the path of movement of the latching member (latch pin 6), which in this case is perpendicular to the line C connecting the centers of the latch pin 6 and the release lever pivot pin 7 at any point during its movement. This relationship between the side walls 13a and 13b of detent notch 13 and the latch pin 6 substantially eliminates play, thereby also substantially eliminating the above described "chucking" of the seatback. This results in a more simple arrangement than prior art devices, which require an adjustable cam in order to eliminate play or extremely close tolerances without adjustment.

Figure 10:
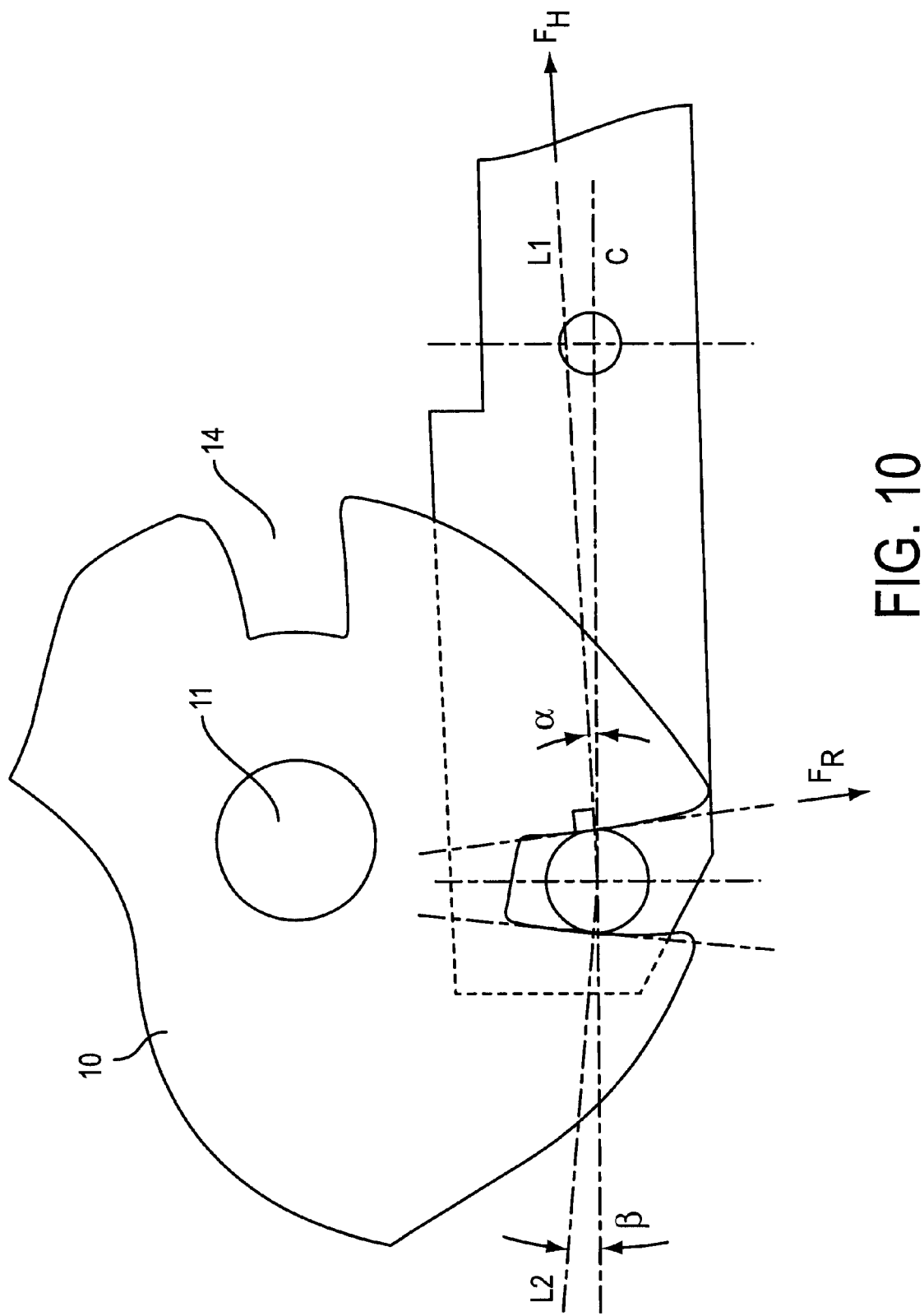
FIG. 10 is an enlarged detail view similar to FIG. 9, and showing the relationship between the latch pin and the detent notch at the contact point therebetween.
Figure 11:
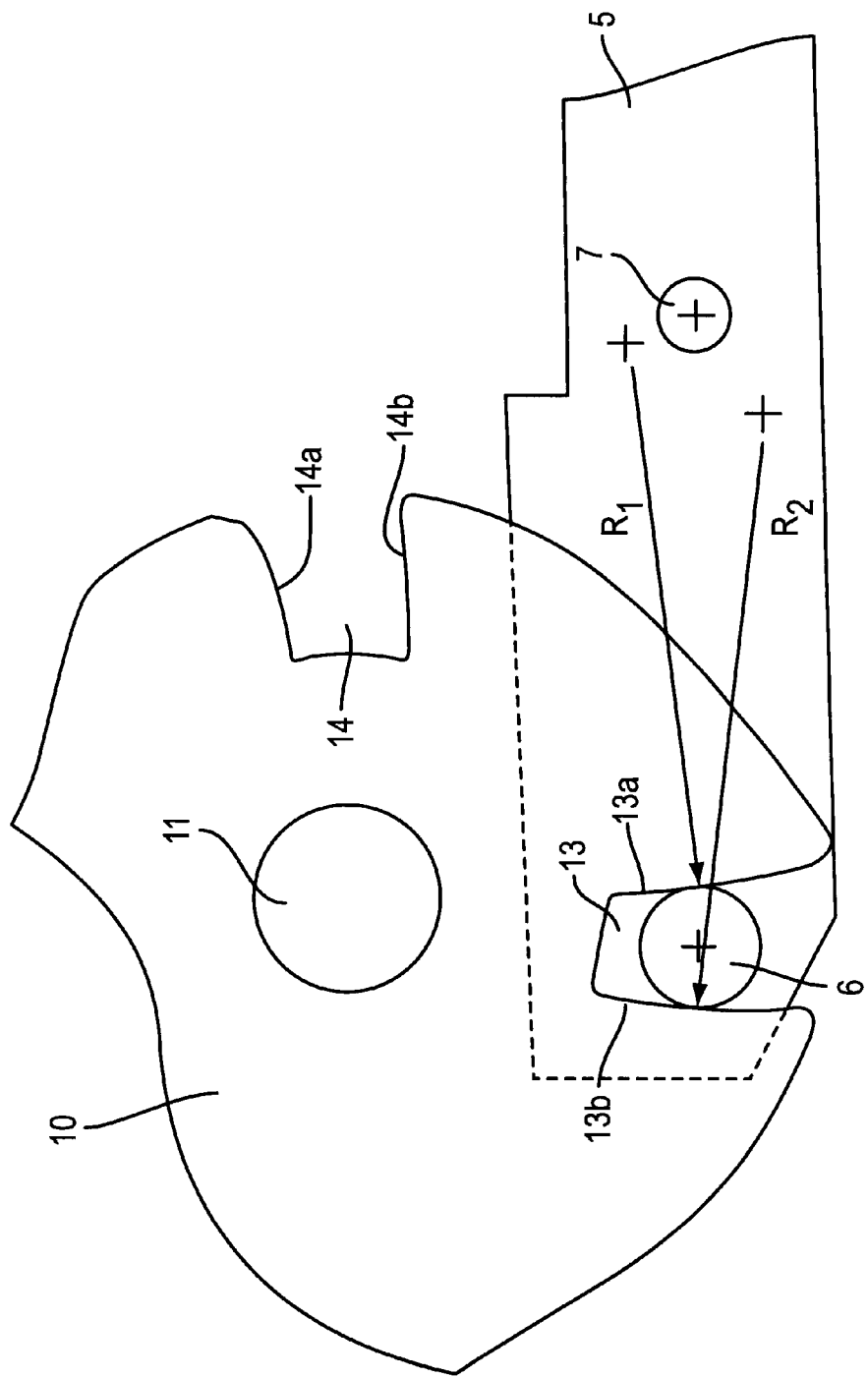
FIG. 11 is an enlarged detailed view, with portions removed to show the configuration of the detent notch of the backrest mounting arm.

Furthermore, the front side wall 13a of the detent notch 13 is configured to engage the latch pin 6 at a contact point (latch point) such that a line L1 perpendicular to a tangent to the surface of the latch pin 6 at the contact point extends at an angle $\alpha$ with respect to the line C passing through the center of the second pivot pin 7 of the release lever 5 and the center of the latch pin 6, as shown in FIG. 10. According to the present invention, the angle $\alpha$ is in a range of greater than about 2° to about 5°, and preferably is about 3.5°. In order to achieve this relationship the center of the radius $R_1$ is offset to the left of and above the center of the pivot 7, as shown in FIG. 11, at a position so that the angle $\alpha$ is maintained in the range of about 2° to about 5°, and in the preferred embodiment of the invention, at about 3.5°.

Moreover, the rear side wall 13b of the detent notch 13 is configured to engage the latch pin 6 at a contact point (latch point) such that a line L2 perpendicular to a tangent to the surface of the latch pin 6 at the contact point extends at an angle $\beta$ with respect to a line C passing through the center of the second pivot pin 7 of the release lever 5 and the center of the latch pin 6, as shown in FIG. 10. According to the present invention, the angle $\beta$ is in a range of greater than about 2° to about 7°, and is preferably about 5°. In order to achieve this relationship the center of the radius $R_2$ is offset to the left of and below the center of the pivot 7, as shown in FIG. 11, at a position so that the angle $\beta$ is maintained in the range of about 2° to about 7°, and in the preferred embodiment of the invention, at about 5°.

Accordingly, due to the above described arrangement of the side walls 13a and 13b of the detent notch 13 and the latch pin 6, a force $F_H$ tending to cause relative pivoting of mounting bracket 1 and the backrest mounting arm 10 includes a radial component $F_R$ that tends to urge the latch pin 6 toward a release position to aid disengagement of the latch pin 6 from detent notch. The angles on the side wall of the detent notches significantly reduce normal release lever loads. However, when the force $F_H$ acting on the backrest mounting arm reaches a threshold value, such as exceeding the maximum normal operating force, i.e., about 200–300 kg, the latch pin 6 is caused to deflect laterally to engage one side wall of the arcuate slot, which thereby prevents the latch pin 6 from movement out of engagement with the detent notch 13 due to the frictional engagement therebetween, so that the backrest mounting arm is maintained in the first position under crash test loads.

Additionally, due to the above described arrangement of the side walls 13a and 13b of the detent notch 13 and the latch pin 6, the force $F_H$ tending to cause relative pivoting of the backrest mounting arm and the mounting bracket 1 acts along the line L1 or L2, such that the force does not act directly along the line C between the centers of the latch pin 6 and the pivot pin 7 of the release lever 5. Thus, the force does not act directly through the center of the pivot pin 7, thereby reducing the shearing load on the pivot pin 7. Moreover, because the latch pin 6 is deflected into engagement with a side wall of the arcuate slot 2 in the mounting bracket 1 in response to application of the threshold load, the load is shared between the mounting bracket 1 and the pivot pin 7 of the release lever. Accordingly, due to the construction and arrangement of the elements of the latching device of the present invention as described above, the latching device carries loads along a primary path, during normal operation, such that the latching device will operate smoothly and efficiently to permit easy operation of the release lever to disengage the latch while also inhibiting "chucking", and also to enable the latching device to carry loads along a secondary path, during a crash or crash testing, that will withstand loads at least sufficient to pass the FMVSS crash test, while providing an efficient design that allows lower operating effort, minimizes "chucking", allows reduction of the weight of the elements forming the latching device, and provides lower manufacturing and assembly costs.

Importantly, because the secondary load path prevents the latching member from disengaging from the detent portion during crash (or crash test) conditions, the components of the latching device defining the primary load path can be configured such that the angled faces of the detent portion have a greater angle than would otherwise be possible. Thus, the latching device will absorb larger tolerances of the components and will provide a more consistent release effort for disengagement during normal conditions. Furthermore, the greater angle of the faces of the detent portion of the present invention also tolerates greater wear of the components during the life of the latching device, without increasing "chucking" of the seatback.

It should be noted that while the latching member or latch pin 6 has been illustrated in the drawings to have a generally circular shape, the shape of the latch pin 6 is not limited to this shape, but may have any suitable shape, including square, rectangular, elliptical, etc. Additionally, the latching member can have a configuration other than that of a latch pin. For example, the locking member could be formed as a hook or other similar member.

Furthermore, an additional bracket may be provided that is configured generally as an allochiral pair to the mounting bracket 1. The additional bracket can be mounted such that backrest mounting arm 10 is positioned between the mounting bracket 1 and the additional bracket. When configured in this manner, the secondary path will carry about 90% of the loads greater than the threshold value.

Figure 12:
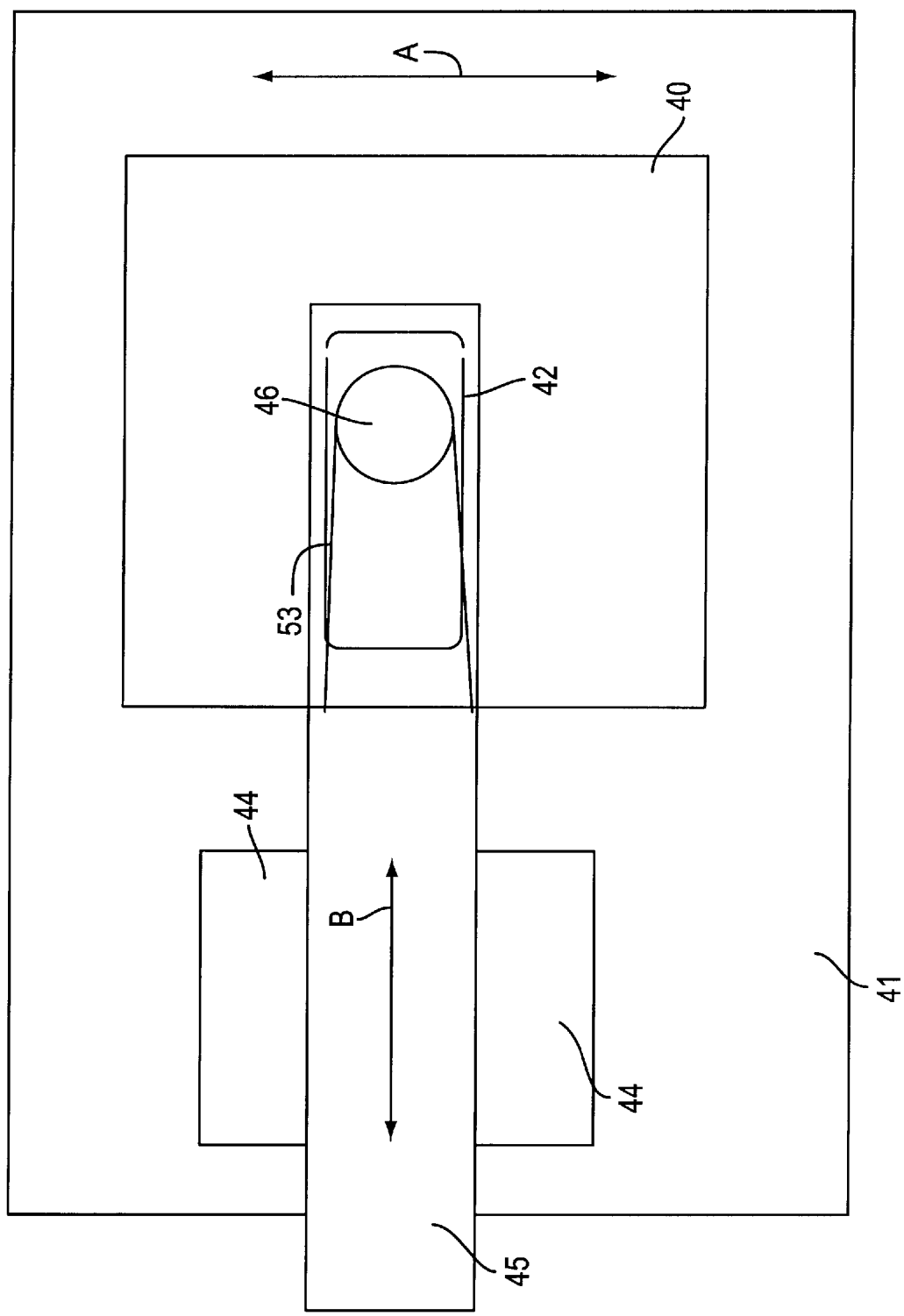
FIG. 12 is a schematic view depicting an alternative arrangement of a latching device of the present invention.

Also, the latching member does not necessarily need to be mounted for swinging movement about a pivot, but could be mounted for lateral sliding movement, as shown schematically in FIG. 12. As shown in FIG. 12, a fixed baseplate 41 is provided, and includes a pair of spaced abutments 44 attached thereto. A lock bar 45 is mounted for reciprocal sliding movement, in the direction of the arrow B, by the abutments 44. A moving part 40 is mounted for movement, in the direction of the arrow A, with respect to the baseplate 41. The moving part 40 includes a detent slot 53 having oppositely angle sides as in the embodiment previously described. Accordingly, this axial movement latch configuration operates in the same manner and includes the same advantages as in the previously described embodiment, except that the lock pin 46 is mounted for sliding movement rather than pivotal movement.

Additionally, the load transfer abutment portion does not necessarily have to be formed as an arcuate slot in the mounting bracket. Rather, the load transfer abutment portion may be formed as a plurality of pins secured to the mounting bracket. Additionally, the load transfer abutment portion could also be formed as a separate member and secured to the vehicle body, or as a plurality of members secured to the vehicle body.

As can be seen from the above, the latching device of the present invention is configured with a detent portion having an angled face between the latch point and a face of the latching member provided on the release lever, which provides a primary load path that permits easy operation of the release handle and results in minimal "chucking" of the seat back during normal operation. Additionally, a load transfer abutment portion connected to the vehicle body is mounted adjacent to the detent portion and the latching member such that upon the application of a threshold load (such as a typical crash test load), the latching member is deflected into engagement with the load transfer abutment portion to prevent release of the latching device and to provide a secondary load path for the much higher loads that must be carried during the crash condition.

Thus, during normal operation, the low loads are carried by the primary load path from the backrest mounting arm through the latching member to the release lever pivot attached to the mounting bracket secured to the vehicle body. The detent portion on the upper arm is angled, relative to the direction of movement of the latching member, to take up the tolerances in the latch components and also to reduce release efforts.

It should be noted that during FMVSS testing or an actual crash condition, the latching member of the latch device immediately deflects and engages the load transfer abutment portion secured to the vehicle body. The load transfer abutment portion has a zero degree angle relative to the load from the backrest mounting arm, and thus there is no radial component of the force. Therefore, friction between the latching member and the load transfer abutment portion prevents the latch from disengaging due to the force component resulting from the angled face of the detent portion.

Accordingly, as a result of the secondary load path that carries the high loads during the FMVSS testing, the angle face on the detent portion used to carry loads under normal operating conditions can be greater, and the latch components of the present invention can be configured without extremely close tolerances yet still prevent "chucking". Furthermore, the latch can be manufactured in high volume production yet have lower and much more consistent operator release handle forces without the concern that the latch will disengage when subjected to the very high FMVSS testing loads.

The invention has been described as usable as a seat latch where the latch retains a seatback in an upright position as well as a forwardly folded position. However, the invention is also suitable to many other applications. For example, the invention may be utilized with a seatback recliner which allows the seatback to be positioned at multiple rearwardly reclined angles, the only difference being that the recliner latch arrangement would have a plurality of locking positions in the rearwardly reclining direction, and would provide the same functional advantages, i.e., low release effort, minimal "chucking", satisfy FMVSS testing requirements, etc.

The present invention may also be applied to manual or power, fore and aft seat adjusters, and other devices that have relatively normal loads and much higher loads for crash test situations (or abnormal events).

Moreover, the present invention may be utilized for general applications such as floor latches for removable seats in vans, utility vehicles, buses, airplanes, etc. to provide low release effort, minimal "chucking", satisfy FMVSS testing requirements, etc. The present invention may also be utilized for trunk latches, door latches, or in any other suitable application.

Although the invention has been described with reference to particular means, materials and embodiments, it is to be understood that the invention is not limited to the particulars disclosed and extends to all equivalents within the spirit and scope of the claims.

What is claimed:

1. A latching device comprising:
   a first bracket configured to be mounted to a support member, said first bracket including a load transfer abutment portion;
   a second bracket pivotally mounted to said first bracket by a first pivot; said second bracket including at least one detent portion to retain said second bracket in a first position;
   a latching member mounted on said first bracket and movable with respect thereto, said latching member extending adjacent said load transfer abutment portion and engagable with said at least one detent portion to retain said second bracket in said first position;
   a primary load path defined between said first bracket, said second bracket and said latching member that carries normal loads associated with said second bracket; and
   a secondary load path defined between said first bracket, said second bracket and said latching member that carries loads above a threshold load associated with said second bracket;
   whereby components forming said latching device may be configured to have greater tolerances without increasing chucking of a seatback that may be connected to one of said first and second brackets and to provide reduced, more consistent release effort for disengagement of said latching member from said at least one detent portion while preventing inadvertent disengagement thereof during conditions above the threshold load.

2. The latching device according to claim 1, further comprising a third bracket configured generally as an allochiral pair to said first bracket, and mounted such that said second bracket is positioned between said first and second brackets, and said secondary path carries 90% of the loads greater than the threshhold value.

3. The latching device according to claim 1, wherein said latching device is provided for a backrest of a vehicle seat.

4. In combination with the latching device according to claim 1, a vehicle seat mountable to a vehicle body, said vehicle seat including a backrest, wherein one of said first and second brackets is mounted to said backrest, and the other of said first and second brackets is mounted to one of a portion of said vehicle seat other than said backrest and a portion of the vehicle body.

5. The combination according to claim 4, wherein said latching member is configured as a hook-shaped member fixed to said release lever.

6. The latching device according to claim 1, wherein said at least one detent portion is formed as a detent notch in said second bracket.

7. The latching device according to claim 6, wherein both side walls of said detent notch angle inwardly toward the bottom of said detent notch, thereby absorbing greater tolerances of components of said latching device and providing a more consistent release effort for disengagement of said latching member from said detent portion.

8. The latching device according to claim 7, wherein both side walls of said detent notch have an arcuate configuration.

9. The latching device according to claim 6, wherein said latching member is formed as a latch pin.

10. The latching device according to claim 9, wherein said latch pin engages a side wall of said detent notch at a contact point such that a line L1 perpendicular to a tangent to the surface of said latch pin at the contact point extends at an angle $\alpha$ with respect to a line C passing through a center of a second pivot of a release lever and a center of said latch pin, said angle $\alpha$ lying within a range of about 2°20 to about 5°.

11. The latching device according to claim 10, wherein said angle $\alpha$ is about 3.5°.

12. The latching device according to claim 6, wherein at least one side wall of said detent notch angles inwardly toward a bottom end of said detent notch, thereby absorbing greater tolerances of components of said latching device and providing a more consistent release effort for disengagement of said latching member from said detent portion.

13. The latching device according to claim 12, wherein said at least one side wall of said detent notch has an arcuate configuration.

14. The latching device according to claim 13, wherein said latching member engages said arcuate side wall of said detent notch at a contact point such that a line L1 perpendicular to a tangent to the surface of said latching member at the contact point extends at an angle $\alpha$ with respect to a line C passing through a center of a second pivot of a release lever and a center of said latching member said angle $\alpha$ lying within a range of about 2° to about 5°.

15. The latching device according to claim 14, wherein said angle $\alpha$ is about 3.5°.

16. The latching device according to claim 14, wherein said arcuate side wall is defined by a radius $R_1$ representing the distance from the center of said second pivot of said release lever to said contact point between said side wall and said latch pin, and the center of said radius $R_1$ is offset from the center of said second pivot such that the angle $\alpha$ is maintained in a range of about 2° to about 5°.

17. The latching device according to claim 16, wherein the center of said radius R1 is offset from the center of said second pivot such that the angle $\alpha$ is maintained at about 3.5°.

18. The latching device according to claim 1, wherein said primary load path is defined by said first bracket, said latching member, said detent portion, and said second bracket, and said secondary load path is defined by said first bracket, said load transfer abutment portion, said latching member, said detent portion, and said second bracket.

19. The latching device according to claim 18, wherein said latching member is configured as a laterally extending portion of said release lever.

20. The latching device according to claim 18, wherein said load transfer abutment portion on said first bracket is formed as a plurality of pins fixedly secured to said first bracket.

21. The latching device according to claim 18, wherein said load transfer abutment portion on said first bracket is formed as a notch portion provided to said first bracket.

22. The latching device according to claim 21, wherein said latching member is configured as a hook-shaped member provided on said release lever.

23. The latching device according to claim 18, wherein said load transfer abutment portion, said detent portion and said latching member are configured such that a load tending to cause relative pivoting of said first and second brackets urges said latching member toward a release position to aid disengagement of said latching member from said detent portion, and when the load reaches the threshold load, said latching member deflects to engage said load transfer abutment portion, such that when the threshold load is exceeded, a portion of the load is carried along said secondary load path, thereby preventing said latching member from movement out of engagement with said detent notch due to frictional engagement between said latching member and said load transfer abutment portion so that said second bracket is maintained in said first position.

24. The latching device according to claim 23, wherein said load transfer abutment portion on said first bracket is formed with a clearance relative to said latching member during normal operation to permit easy disengagement of said latching member from said detent portion upon actuation of said latching member to a release position, said clearance further being such that said latching member engages said load transfer abutment portion when deflected by the threshold load, which prevents said latching member from movement out of engagement with said detent portion so that said second bracket is maintained in said first position.

25. The latching device according to claim 24, wherein said load transfer abutment portion in said first bracket is formed as an arcuate slot with two generally arcuate side walls concentric with a second pivot about which said latching member is movable, and said arcuate slot is sized to receive said latching member with said clearance during normal operation to permit easy disengagement of said latching member from said detent portion upon actuation of said latching member toward the release position, said clearance further being such that said latching member engages said load transfer abutment portion, when deflected by the threshold load, to define said secondary load path.

26. The latching device according to claim 25, wherein said clearance is about 0.25 mm to about 1.25 mm.

27. The latching device according to claim 26, wherein said clearance is about 0.5 mm.

28. The latching device according to claim 27, wherein said clearance is about 0.5 mm.

29. A latching device comprising:
a first bracket configured to be mounted to a support member, said first bracket including a load transfer abutment portion;
a second bracket mounted for movement relative to said first bracket, said second bracket including at least one detent portion to retain said second bracket in a first position;
a latching member mounted on said first bracket and movable with respect thereto, said latching member extending adjacent said load transfer abutment portion and engagable with said at least one detent portion to retain said second bracket in said first position;
a primary load path defined between said first bracket, said second bracket and said latching member that carries normal loads associated with said second bracket; and
a secondary load path defined between said first bracket, said second bracket and said latching member that carries loads above a threshold load associated with said second bracket;
whereby components forming said latching device may be configured to have greater tolerances without increasing chucking of a device that may be connected to one of said first and second brackets and to provide reduced, more consistent release effort for disengagement of said latching member from said at least one detent portion while preventing inadvertent disengagement thereof during conditions above the threshold load.

30. The latching device according to claim 29, further comprising a third bracket configured generally as an allochiral pair to said first bracket, and mounted such that said second bracket is positioned between said first and second brackets, and said secondary path carries 90% of the loads greater than the threshhold value.

31. The latching device according to claim 29, wherein said at least one detent portion is formed as a detent slot in said second bracket.

32. The latching device according to claim 31, wherein at least one side wall of said detent slot angles inwardly toward a bottom end of said detent slot, thereby absorbing greater tolerances of components of said latching device and providing a more consistent release effort for disengagement of said latching member from said detent portion.

33. The latching device according to claim 32, wherein said latching member engages said side wall of said detent slot at a contact point such that a line L1 perpendicular to a tangent to the surface of said latching member at the contact point extends at an angle $\alpha$ with respect to a line C passing through a center of a second pivot of a release lever and a center of said latching member said angle $\alpha$ lying within a range of about 2° to about 5°.

34. The latching device according to claim 33, wherein said angle $\alpha$ is about 3.5°.

35. The latching device according to claim 29, wherein said primary load path is defined by said first bracket, said latching member, said detent portion, and said second bracket, and said secondary load path is defined by said first bracket, said load transfer abutment portion, said latching member, said detent portion, and said second bracket.

36. The latching device according to claim 35, wherein said latching member is mounted for sliding movement.

37. The latching device according to claim 35, wherein said load transfer abutment portion, said detent portion and said latching member are configured such that a load tending to cause relative movement of said first and second brackets urges said latching member toward a release position to aid disengagement of said latching member from said detent portion, and when the load reaches the threshold load, said latching member deflects to engage said load transfer abutment portion, such that when the threshold load is exceeded, a portion of the load is carried along said secondary load path, thereby preventing said latching member from movement out of engagement with said detent portion due to frictional engagement between said latching member and said load transfer abutment portion so that said second bracket is maintained in said first position.

38. The latching device according to claim 37, wherein said load transfer abutment portion on said first bracket is formed with a clearance relative to said latching member during normal operation to permit easy disengagement of said latching member from said detent portion upon actuation of said latching member to a release position, said clearance further being such that said latching member engages said load transfer abutment portion when deflected by the threshold load, which prevents said latching member from movement out of engagement with said detent portion so that said second bracket is maintained in said first position.

39. The latching device according to claim 38, wherein said load transfer abutment portion in said first bracket is formed as a slot with two side walls generally perpendicular to the direction in which said latching member is movable, and said slot is sized to receive said latching member with said clearance during normal operation to permit easy disengagement of said latching member from said detent portion upon actuation of said latching member toward the release position, said clearance further being such that said latching member engages said load transfer abutment portion when deflected by the threshold load to defined said secondary load path.

40. The latching device according to claim 39, wherein said clearance is about 0.25 mm to about 1.25 mm.

41. A latching device for a backrest of a vehicle seat, said latching device comprising:
   a mounting bracket configured to be mounted to a support member, said mounting bracket including a load transfer abutment portion;
   a backrest mounting arm pivotally mounted to said mounting bracket by a first pivot; said backrest mounting arm including at least one detent notch to retain said backrest mounting arm in a first position;
   a release lever pivotally mounted to said mounting bracket by a second pivot spaced from said first pivot; said release lever including a latching member fixed at a position spaced from said second pivot, said latching member extending adjacent said load transfer abutment portion and engagable with said at least one detent notch to retain said backrest mounting arm in said first position;
   a primary load path defined between said mounting bracket, said backrest mounting arm and said latching member that carries normal loads associated with said backrest mounting arm; and
   a secondary load path defined between said mounting bracket, said backrest mounting arm and said latching member that carries loads above a threshold load associated with said backrest mounting arm;
   whereby components forming said latching device may be configured to have greater tolerances without increasing chucking of a seatback that may be connected to said backrest mounting arm and to provide reduced release effort for disengagement of said latching member from said at least one detent portion while preventing inadvertent disengagement thereof during conditions above the threshold load.

42. The latching device according to claim 41, further comprising a third bracket configured generally as an allochiral pair to said mounting bracket, and mounted such that said backrest mounting arm is positioned between said mounting bracket and said second bracket, and said secondary path carries 90% of the loads greater than the threshhold value.

43. The latching device for a backrest of a vehicle seat according to claim 41, wherein said load transfer abutment portion, said detent notch and said latching member are configured such that a load tending to cause relative pivoting of said mounting bracket and said backrest mounting arm urges said latching member toward a release position to aid disengagement of said latching member from said detent notch, and when the load reaches a threshold value, said latching member deflects to engage said load transfer abutment portion, thereby preventing said latching member from movement out of engagement with said detent notch due to frictional engagement between said latching member and said load transfer abutment portion so that said backrest mounting arm is maintained in said first position.

44. The latching device for a backrest of a vehicle seat according to claim 43, wherein said load transfer abutment portion on said mounting bracket is formed with a clearance relative to said latching member during normal operation to permit easy disengagement of said latching member from said detent notch upon actuation of said release lever, said clearance further being such that said latching member engages said load transfer abutment portion when deflected by the threshold load, which prevents said latching member from movement out of engagement with said detent notch so that said backrest mounting arm is maintained in said first position.

45. The latching device for a backrest of a vehicle seat according to claim 44, wherein said load transfer abutment portion in said mounting bracket is formed as an arcuate slot with two generally arcuate side walls concentric with said second pivot and sized to receive said latching member with said clearance during normal operation to permit easy disengagement of said latching member from said detent notch upon actuation of said release lever, said clearance further being such that said latching member engages said load transfer abutment portion when deflected by the threshold load.

46. The latching device for a backrest of a vehicle seat according to claim 45, wherein said clearance is about 0.25 mm to about 1.25 mm.

47. The latching device for a backrest of a vehicle seat according to claim 46, wherein said clearance is about 0.5 mm.

48. The latching device for a backrest of a vehicle seat according to claim 41, wherein at least one side wall of said detent notch angles inwardly toward a bottom end of said detent notch, thereby absorbing greater tolerances of components of said latching device and providing a more consistent release effort for disengagement of said latching member from said detent portion.

49. The latching device for a backrest of a vehicle seat according to claim 48, wherein said at least one side wall of said detent notch has an arcuate configuration.

50. The latching device for a backrest of a vehicle seat according to claim 49, wherein said latching member engages said arcuate side wall of said detent notch at a contact point such that a line L1 perpendicular to a tangent to the surface of said latch pin at the contact point extends at an angle α with respect to a line C passing through a center of said second pivot of the release lever and a center of said latching member, said angle α lying within a range of about 2° to about 5°.

51. The latching device for a backrest of a vehicle seat according to claim 50, wherein said angle α is about 3.5°.

52. The latching device for a backrest of a vehicle seat according to claim 51, wherein both side walls of said detent notch angle inwardly toward the bottom of said detent notch, thereby absorbing greater tolerances of components of said latching device and providing a more consistent release effort for disengagement of said latching member from said detent portion.

53. The latching device for a backrest of a vehicle seat according to claim 52, wherein both side walls of said detent notch have an arcuate configuration.

* * * * *

UNITED STATES PATENT AND TRADEMARK OFFICE
CERTIFICATE OF CORRECTION

PATENT NO.     : 6,435,616 B1
DATED          : August 20, 2002
INVENTOR(S)    : W. Travis et al.

It is certified that error appears in the above-identified patent and that said Letters Patent is hereby corrected as shown below:

Column 16,
Line 36, after "2º" delete "20".

Column 17,
Line 63, "claim 27" should be -- claim 40 --.

Signed and Sealed this

Third Day of June, 2003

JAMES E. ROGAN
*Director of the United States Patent and Trademark Office*